Oct. 31, 1961           H. F. EICHACKER           3,006,712
METER READING AND RECORDING DEVICES
Filed Sept. 12, 1958           4 Sheets-Sheet 1
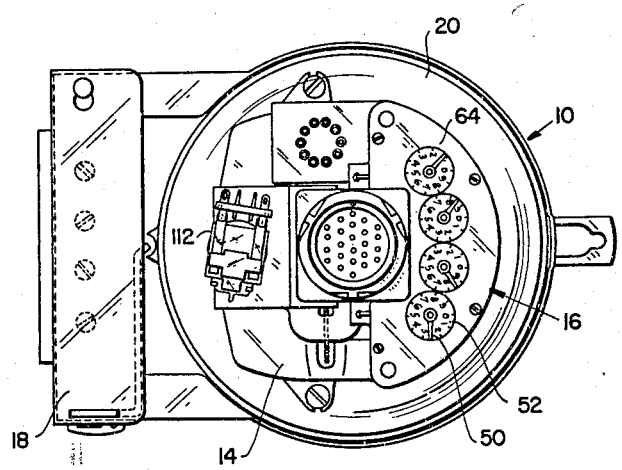
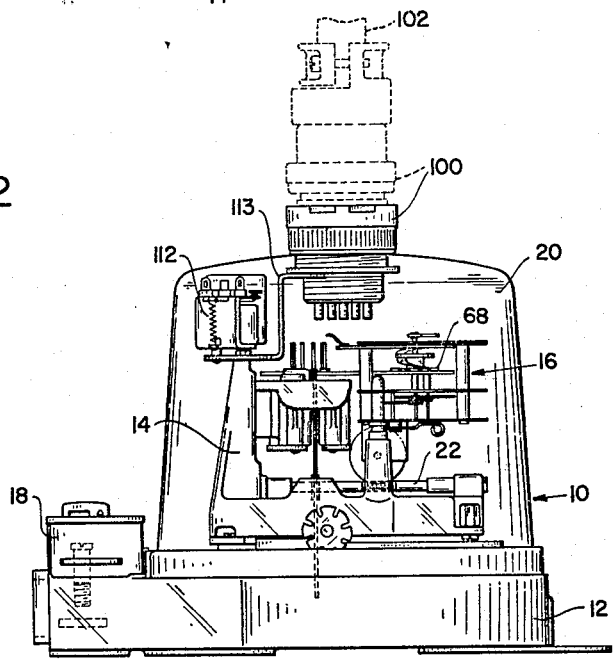
INVENTOR.
HAROLD F. EICHACKER
BY
Joseph J. Schofield
ATTORNEY Oct. 31, 1961  H. F. EICHACKER  3,006,712
METER READING AND RECORDING DEVICES
Filed Sept. 12, 1958  4 Sheets-Sheet 2

INVENTOR.
HAROLD F. EICHACKER
BY
Joseph H. Schofield
ATTORNEY

Oct. 31, 1961    H. F. EICHACKER    3,006,712

METER READING AND RECORDING DEVICES

Filed Sept. 12, 1958      4 Sheets-Sheet 3

INVENTOR.
HAROLD F. EICHACKER
BY
ATTORNEY

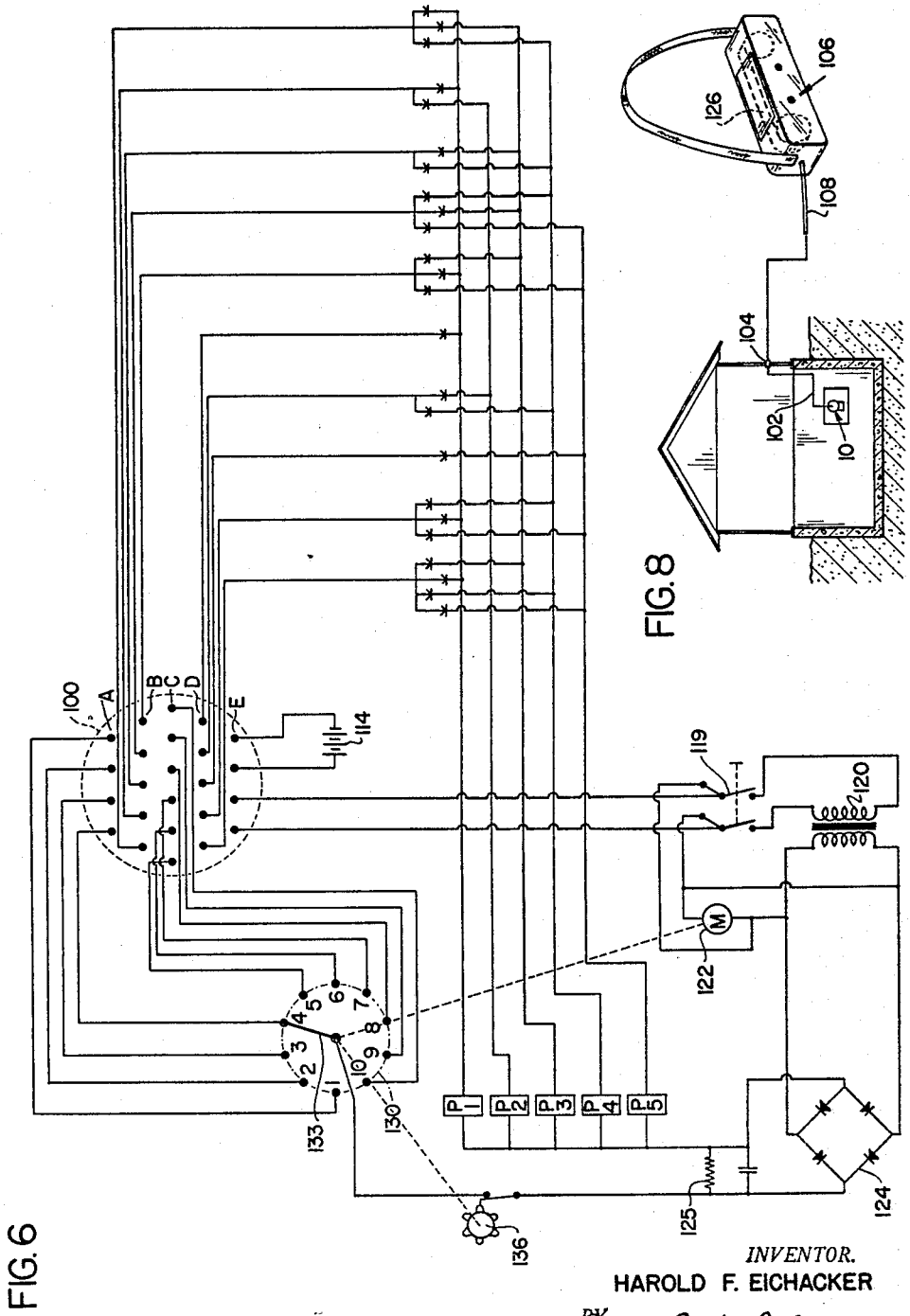

United States Patent Office 3,006,712
Patented Oct. 31, 1961

3,006,712
METER READING AND RECORDING DEVICES
Harold Frank Eichacker, Wethersfield, Conn., assignor, by mesne assignments, to Ripley Company, Incorporated, Middletown, Conn., a corporation of New York
Filed Sept. 12, 1958, Ser. No. 760,613
3 Claims. (Cl. 346—14)

This invention relates to improvements in reading meters and permanently recording the readings. More particularly the invention relates to facilitating readings of utility multiple dial meters for electricity, gas, water and the like.

A primary object of the invention is to provide an improved method for the direct recording of meter readings on a punched tape or the like to permit the record to be processed through automatic apparatus, such as a billing computor.

Another objective is to provide improved apparatus for obtaining a permanent record of a meter reading and an identification of the meter at a convenient location in the vicinity of the meter but without the necessity the reader having physical access to the meter, thereby eliminating the inconveniences imposed on customers and loss of time by the reader as when entrance to buildings cannot be obtained at the convenience of the reader.

Another object is to provide apparatus of low manufacturing cost for the conversion of existing conventional type meters, such as electric and gas meters designed for visual reading, in a manner to incorporate the invention.

Still another object is to provide an improved system which eliminates the possibility of error during the reading and recording operation thus permitting employment of readers of limited skill, and by which a reading may be obtained in a fraction of the time heretofore required, thereby reducing the number of readers required for a service area.

Other objects and advantages will become apparent to persons skilled in the art as will various modifications of the illustrated embodiment without departure from the inventive concepts, the scope of which is defined by the appended claims.

In the drawings:

FIG. 1 is a plan view of an otherwise conventional glass dome protected watt-hour meter shown modified to incorporate the invention.

FIG. 2 shows in side elevation the meter of FIG. 1.

FIG. 6 is a wiring diagram of a standard punch tape recorder as modified for plug-in attachment to the meter shown in FIG. 5.

FIG. 8 diagrammatically illustrates the manner in which a housed meter is connected through an accessible fixture mounted on an outside wall to a reading and recording device.

Figure 3:
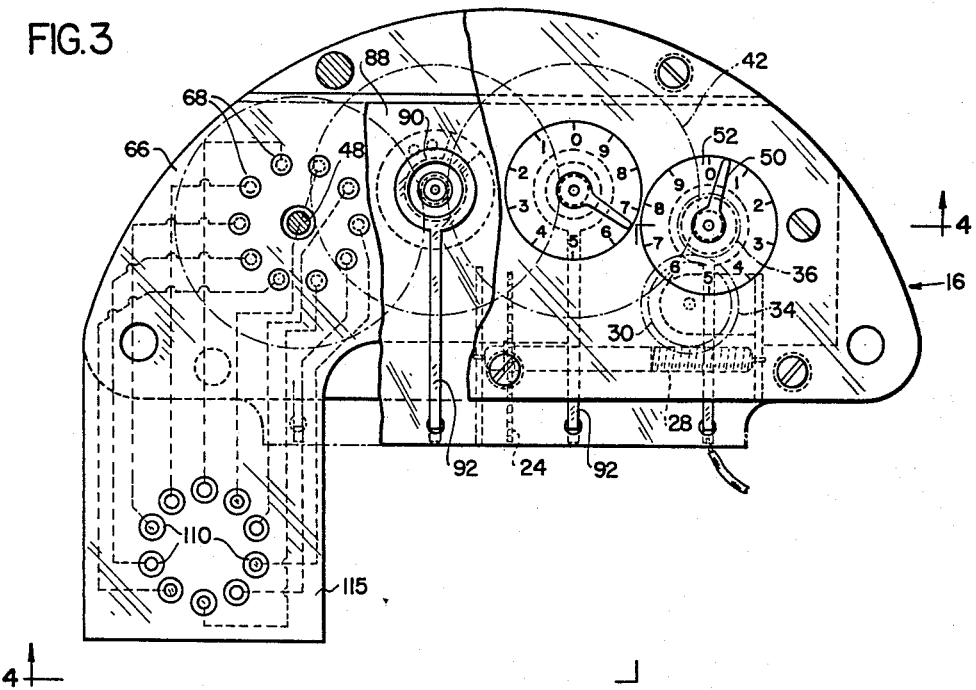
FIG. 3 is a plan view of apparatus constructed in accordance with the invention for the conversion of a visually read meter for automatic reading and recording at a remote point.

The desirability of eliminating the need for meter readers to enter private dwellings and other buildings to obtain a visual reading has long been recognized. Proposals for remote reading have been advanced, and apparatus suggested for automatically transmitting the required information to a central station. Visual reading has remained the common practice, however, since the cost of the elaborate systems heretofore proposed have been shown to be prohibitive. While the safety, risks, inconvenience, and other objectionable features of inside reading are avoided in some of the newly constructed homes by placing the meters exteriorly of the building, such installations represent only a minor percentage of the millions of homes serviced by utility companies. The present invention permits the conversion of multiple dial meters in current use, which require visual reading, to permit a meter reader to obtain quickly, from a point exteriorly of a residence, for example, an automatically produced record of the reading directly in a form to be later processed by automatic billing equipment of a known type.

Since the equipment herein disclosed represents only a fraction of the cost of the highly complex central systems heretofore proposed, while permitting a non-skilled reader to obtain the reading without error and in a fraction of the time formerly required, the invention fills a need of long standing by solving the problem in an economically sound manner. Since the method and apparatus described herein eliminate error both at the meter, and later at the billing office, its advantages are not limited solely to inaccessible meters, and it is intended that all meters within a service area, regardless of whether housed or exposed, be converted to include the invention.

As shown in FIGS. 1 and 2, a watt-hour meter, generically designated 10, includes a base 12 on which is supported a framework 14 for the support of known drive mechanism between a revolving armature, not shown, and a digital type indicator assembly 16. Terminal block 18 and a glass protective dome 20 are of conventional construction, but dome 20 is provided with an upper wall aperture to permit a bracket mounted amphenol multiple connector 100 to extend upwardly through the dome.

Figure 4:
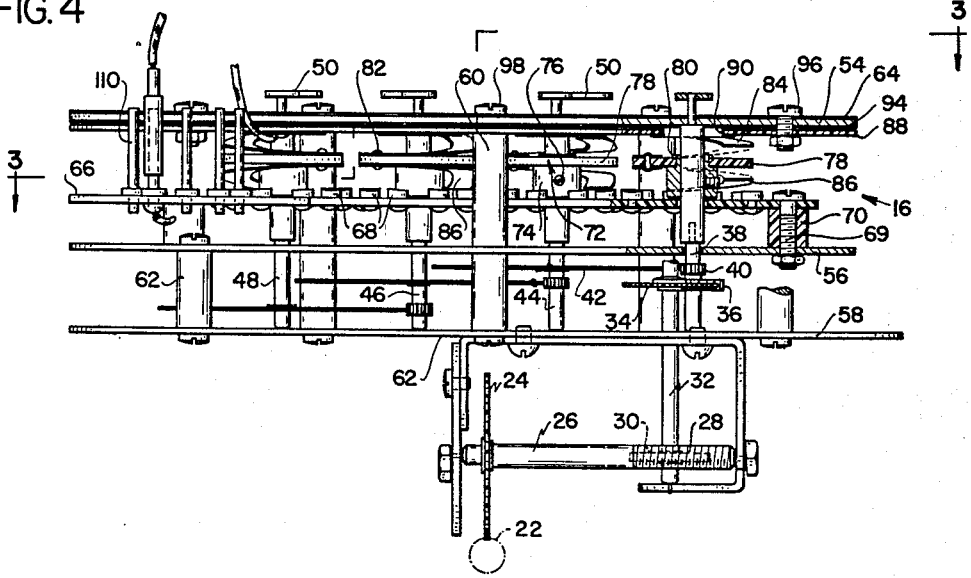
FIG. 4 is a side elevational view, partly in section, of the device of FIG. 3.

FIG. 4 illustrates the indicator assembly gear trim journalled in a suitable framework wherein a worm gear 22, driven by the armature of the meter at a rate proportional to current flow, transmits power through gear 24, shaft 26, gears 28 and 30, shaft 32, and gears 34 and 36 to a rotatable digit shaft 38, and through a train of reduction gearing, such as gears 40 and 42 to other digit shafts 44, 46, and 48. There is of course a 10 to 1 ratio between each successive digit shaft. The structure described above is found in many watt-hour meters in current use, with each shaft 38, 44, 46 and 48 provided at its upper end with a pointer 50 which rotates above a circular dial having ten divisions, such as dial 52, for visual indication of the shaft positions.

The manner in which a meter of the above type is modified at comparatively low cost and well within practical cost limits to incorporate the present invention is best shown in FIG. 4. The gear train framework 16 conventionally includes three plate-like members 54, 56 and 58, maintained clamped in parallel spaced relation by suitable spacers such as shown at 60 and 62. A faceplate 64 on the upper surface of plate 54, and bearing the numerical indicia shown in FIG. 1 completes the assembly which is held together by suitable screws as shown.

Conversion of the watt-hour meter herein illustrated, a type which has been accepted as standard by most utility companies in this country, to permit remote reading and recording as herein taught is accomplished by the addition of a relatively few low cost parts which may be supplied in the form of a conversion kit.

To effect the conversion, pointers 50 are removed, as are the screws holding face plate 64 and upper plate 54 to permit removal of those parts. An electrically insulating plate 66, to which contact points 68 have been fixed in circular arrays about apertures positioned to allow the digit shafts to extend concentrically therethrough, is then slipped down over the shafts and so positioned. Plate 66 is then clamped by screws 69 against insulating spacers 70, center plate 56 having been provided with the necessary threaded bores prior to the positioning of plate 66. With plate 66 firmly clamped in place to position the contact points 68 concentrically about each digit shaft, a wiping type contactor 72 is next installed on each digit shaft. Each contactor 72 includes an annular collar 74 having a set screw 76 for adjustably fixing the contactor longitudinally of its shaft. An insulating washer 78 is riveted to one end of collar 74 at 80 firmly to position the washer radially of the collar and shaft. A pair of wiper contacts, riveted to washer 78 near the outer margin thereof at 82 extend axially in helical configuration, one on each side of the washer. Upper contact 84 is of reverse pitch in respect to lower contact 86, with the contacts being symmetrically disposed in respect to the washer and the digit shaft.

The contractors are of suitable light weight metal sheet stock having good electrical conductivity characteristics while resisting permanent deformation over long operating periods during which they are maintained slightly compressed. The lower contactor 86 extends between washer 78 and contact points 68 to exert sufficient pressure on the points which are selectively engaged by the outer end thereof to insure a good electrical connection without increasing resistance to rotation of the digit shafts beyond that which is easily handled by the conventional digital gear train described above. With set screw 76 loose, collar 74 is adjusted to select the desired amount of bias of the wiping end of contactor 86 against a contact point 68. Contactor rotation is in a direction to cause the outer end of contactor 86 to wipe from a direction of upward inclination, hence bridging of the contact points is not required for smooth operation, and the terminal wiping surface of contactor 86 is less than the spacing between the contact points to insure circuit closure between the contactor and only one contact pointer at a time. An elcrically insulating plate 88, also not a part of the original meter, is next installed. Plate 88 is provided with annular brass grommet-like inserts 90 positioned concentrically of each digit shaft to serve as electrical collectors against which the free end of each upper wiper blade is held urged by inherent bias to insure a positive electrical connection therebetween.

As shown in FIG. 3, each insert 90 has a terminal strip 92, leading from collector 90, for connection to circuitry later described. Plate 88 is then covered with a thin insulating plate 94 and upper plate 54 and face plate 64 are replaced and the assembly bolted together as by clamp bolts 96 and screws 98 threaded to the separator posts. The sole purpose of plate 94 is to insulate collector contacts 90 and terminal strips 92 from the metal upper plate 54. Pointers 50 are then replaced, since the above modification does not alter operation of the meter as a visually read instrument. Control relay 112, an added part, is bolted to framework 14 and connector 100 mounted through dome 20 to a suitable bracket 113 to complete the meter modification except for wiring of the installed parts to connector 100. Since all parts such as contact points and terminals mounted to insulating plate 66 are preferably connected by printed circuitry, the number of flexible leads required is minimized and installation simplified.

The manner in which the meter, modified as above, may be read from a convenient location exteriorly of a building in which it is housed is shown in FIG. 8. A 24 lead conduit 102 extends from connector 100 of meter 10 to a fixture 104 of the plug-in type which may be housed in a protective junction box with a hinged cover for easy access. An automatic reading and recording unit 106, designed for portability, and easily carried by a reader, has a 24 lead conduit 108 which terminates in a mating fixture for connection to fixture 104, hence through conduit 102 to the meter. Unit 106 is of the type wherein a plurality of punches are actuated in various code patterns to perforate a moving tape or the like which may later be fed into decoding apparatus and the information thereon used to actuate automatic computing and billing units. While such apparatus is in current use for coding and decoding many types of data and the mechanism involved in such decoders forms no part of the present invention, novel control circuitry between the modified meter and the tape punching mechanism housed in unit 106 is a part of the invention as will become apparent from the following description.

As shown dotted in FIG. 3, printed circuitry connects each of the ten contact points 68 about the left digit shaft 48 to individual plugs of a ten prong male fixture the prongs 110 of which are fixed to extend upright from an arm-like integral extension 115 of plate 66. While not shown, like contact points of the four circular groups of contacts encircling the four digit shafts are connected in parallel. A suitable mating fixture, not shown, connects the ten prongs 110 through connector 100 to unit 106 in the manner shown in FIGS. 5, 6, and 7. While the use of a detachable connector between the parallel connected arrays of contact points and the leadout connector 100 simplifies modification of the meter and permits low cost fabrication and installation of plate 66 as a unit, the meter wiring diagram of FIG. 5 does not show that connector in circuit since it would complicate the diagram without in any way changing the circuit.

Figure 5:
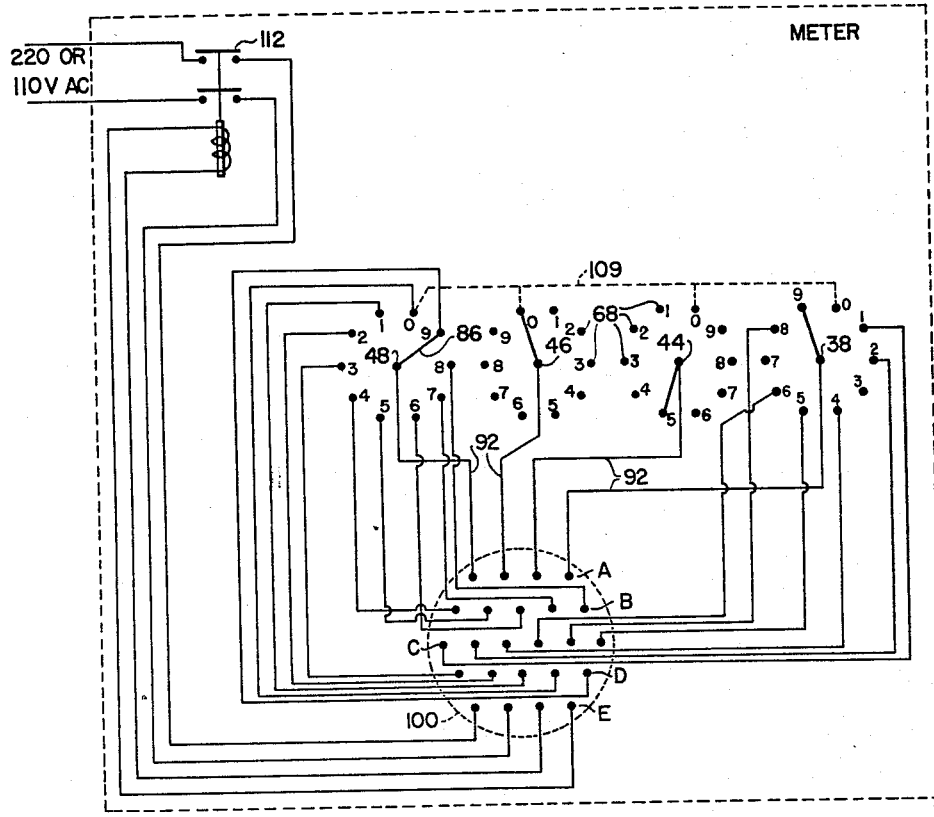
FIG. 5 is a wiring diagram for a meter of the four dial digital indicator type as modified to incorporate the invention.

FIG. 5 shows the manner in which those parts housed in the meter are wired to connector 100, while FIG. 6 shows the circuitry of unit 106, with connector 100 shown in the same relative position as in FIG. 5 to show the wiring of the conduit leads therefrom. The horizontal rows of connector contacts are given letters A, B, C, D and E to simplify reference thereto. While separately shown, the meter circuit of FIG. 5 and the punch unit circuit of FIG. 6, constitute a single circuit during operation of unit 106, and will be so described. FIG. 5 shows the digit shafts 38, 44, 46 and 48 each carrying a wiper contactor 86 with the wipers shown in different positions. A lead from each collector electrode 92 is connected to one of the four connector prongs in row A. As above stated, corresponding contact points 68 of each array are connected in parallel, hence a connection to one connects all four, as shown by the single dotted line 109, the others being omitted for simplicity of detail. Each ten of the four like interconnected points 68 lead, through the detachable connector plug above described but not herein shown, to one of the ten prongs in rows B and D of connector 100. There are thus ten common leads to unit 106 from the forty connector points in the meter, but since each wiper 86 can assume any one of ten positions, forty possible circuit closures are thus readable by unit 106 as described below. The center row C of connector prongs are directly wired to selected contact points 68 chosen to indicate the serial number of the meter to six digits, the numbers represented by each point being shown in FIGS. 1 and 5.

As shown in FIG. 5 the serial number of the meter is shown by the connections to the successive contactors in row C of the connector 100. The serial number of the meter illustrated is 124,685. This is for the reason that the successive contacts in row C are connected to these digits of the first dial over which the pointer on digit shaft 38 rotates. Two of the four prongs in connector row E provide battery input current to relay 112 from a dry battery 114 housed in unit 106, and the remaining two prongs connect the line voltage current from the meter input to unit 106 for motor and rectifier operation shown in FIG. 6, as described below.

The broad purpose of the circuitry shown in FIG. 6 is to sense the relative position of each one of the digit shafts and to convert that position into code form and produce a permanent record of those positions and the serial number of the meter for later read-out. With unit 106 plugged into fixture 104 battery 114 actuates relay 112 in the meter to a circuit closing position to connect switch 119 to the power line. Since the line voltage may be of one of two values, such as either 220 or 110 volts A.C., switch 119 is manually operable to permit the reader to use the unit on either voltage. With switch 119 in the FIG. 6 position, the punch unit drive motor 122 is directly connected to the line, as is a bridge type rectifier 124, in parallel therewith, the output of which is used for punch actuation. As so connected the unit operates on the lower voltage, it being merely necessary to throw switch 119 to the alternate position to connect in a step-down transformer 120 for operation at the higher voltage. The output of rectifier 124 is suitably filtered at 125 and is series connected to one or more of a plurality of punches, P–1 to P–5 as a motor driven wiper type selector 130 or alternate type of progressive switch closes ten circuits in succession, each of which is associated with at least one or more punches to record in code the information obtained as the result of the closure of that particular circuit.

It will be understood that motor 122 in the punch unit has associated control circuitry, not shown, and a clutch controlled drive to rotary switch 130 to cause that switch to sweep through one revolution to pick off from the ten contacts first the readings of the four meter dials and then pick off the serial number of the meter from the remaining six contacts. To insure a single positive reading as the rotor 133 of switch 130 scans the contacts, an interrupter switch 136 is series connected in the D.C. line. Interrupter 136 may be of the rotor type and synchronized to connect the D.C. to rotor 133 only at a point of full registry between the rotor and one of the switch contacts.

Figure 7:
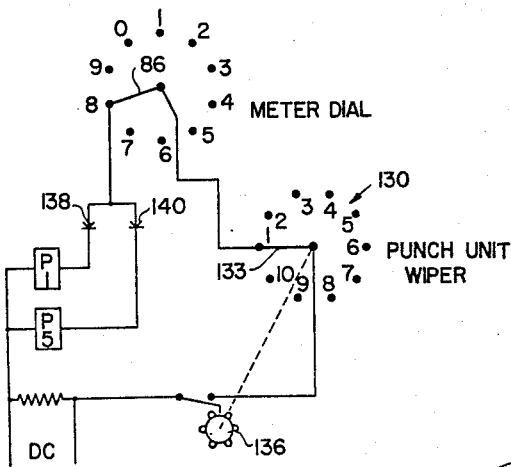
FIG. 7 is a simplified wiring diagram illustrating one branch of the meter reading circuitry between the meter and punch unit.

The basic circuit for converting a single meter reading into code pattern on tape or the like is shown in FIG. 7. At the start of a reading, the first of the meter dials to be read is shown with its wiper contactor on contact point number 8 with the punch unit rotor 130 making contact in the first position. Interrupter 136 is mechanically synchronized with selector switch 130 to prevent arcing during switch rotation and when closed connects punches 1 and 5 through rectifier diodes 138 and 140 to the D.C. source shown, through the closed switches in both the meter and punch unit for actuation of those punches. Motor 122 is of course, being driven to move a tape 126, FIG. 8, past the punches at a uniform rate of speed. The punches are spaced transversely of the tape, hence a code pattern, comprising in this instance a punch hole near each opposite tape margin results, representing position 8 on the meter dial. As the punch unit rotor 133 of the selector switch 130 moves to the number 2 position, a reading indicative of the next meter dial is obtained in a similar manner, it being understood that there are ten different punch pattern controlling return legs from the ten meter contact points to the various punches 1 to 5, as shown in FIG. 6.

The manner in which five punches may be selectively controlled to produce ten numeral codes is well understood in the art and requires no further comment. The function of the various diodes is to eliminate surges, hence spurious readings. The manner in which the punches are released under a biasing urge, or are otherwise propelled to perforate the tape forms no part of the present invention. Only the first four switch positions of rotor 133 are required for a complete reading of a four dial meter, the other six serving to provide the serial number. It will be noted that the six prongs of row C of the meter connector, as shown in FIG. 5, are directly wired to six of the contact points about one of the digit shafts, it being immaterial to which group they are wired so long as their relative position is maintained. This wiring is done at the time of meter modification as above, with the connections so arranged that as the punch unit rotor 133 travels clockwise as shown in FIG. 6, punch patterns representative of the numerals are progressively obtained. It will be noted that in obtaining the serial number in this manner the circuitry operates much in the same manner as when reading the dial settings, except that the meter wipers 86 are inactivated, as are their return circuit, with a return circuit substituted therefor directly from the contact points to the coding punch circuits. Where the same figure occurs in succession in a serial number, the successive contacts in rotor switch 130 lead to the same contact point in the meter array to repeat that figure.

It is thus seen that by incorporation of the invention, conventional visually read meters may be modified in an economical manner to permit a reader, by performing a very simple plug-in operation, automatically to obtain both the dial readings and the identifying serial number in permanent record coded form preferably by successive transverse punchings in a tape. By further modifications as herein taught, the major operating components of a known punched tape unit may be utilized to provide a portable reading unit at a cost well within sound economic brackets. For a given service area, only a few of such recording units are required, one only for each meter reader. The method and apparatus provides all the advantages of a centralized system except the complete elimination of the reader, but the savings in operational and maintenance costs more than counter-balance that factor.

I claim:

1. In a meter, a pair of metal plates and an electrically insulating plate, means maintaining said plates in parallel spaced relation with said insulating plate intermediate said metal plates, a plurality of spaced digit shafts journalled in said metal plates to extend transversely thereof, power input means for said digit shafts, means drivingly interconnecting said shafts at progressive digital reduction ratios, plural groups of electrical contact points fixed to said insulating plate to form circular arrays concentrically of said shafts, a wiper type contactor fixed to each shaft between one of said metal plates and said insulating plate, each said contactor comprising a metal collar, output means for said contactors, means for adjustably clamping the collar to a shaft, a washer-like dielectric member fixed to each collar to extend radially thereof, a pair of helical contactor springs fixed to each di-electric member, said springs extending axially from opposite sides thereof, each said di-electric member being positioned on its shaft to lightly urge the free end of one of said springs against the contact points of the shaft encircling array, a collector structure encircling each shaft for continuous engagement by the other spring of the contactor, and an output for said collector structure.

2. In a device of the character described, a multiple dial digital indicator, a switching device associated with each dial to indicate, by circuit closure, the rotated position of each dial, a transparent housing enclosing said indicator to permit visual reading thereof, a multiple contact connector extending through said housing, a punch tape unit positioned exteriorly of said housing, conduits forming a detachable electrical circuit interconnecting said switching devices and said tape punching unit through said connector, a battery operable relay mounted in said housing, a battery in said unit for said relay, conduits connecting said battery and said relay through said connector, a switch in said unit for the control of battery current for relay actuation, conduits connecting line current to said relay, and conduits leading from said relay through said connector to said tape unit for the connection of the line current thereto responsive to closure of said battery current switch.

3. A device for converting multiple dial meter readings to punched tape form having in combination, a multiple contact switch associated with each meter dial to effect selective contact closure indicative of a dial position, a plurality of tape perforating punches operable in response to D.C. signals, a source of D.C. current, a multiple channel circuit connecting corresponding contacts of said switches in parallel and said punches to each set of connected contacts through a channel for actuation of one or more punches in a code pattern representative of each contact of said parallel connected switches, unidirectional current flow devices in each channel for the suppression of surge currents in one direction, selective switching means between said dial switches and said channels for sequential connection of the channels to each of the dial switches, and interruptor means synchronized with said selective switching means and in circuit with said D.C. source to activate said channel circuits only when said selective switching means is in one of its circuit closing positions.

References Cited in the file of this patent

UNITED STATES PATENTS

| | | |
|---|---|---|
| 1,244,634 | Neff et al. | Oct. 30, 1917 |
| 1,737,863 | Noonan | Dec. 3, 1929 |
| 1,800,019 | Hewett | Apr. 7, 1931 |
| 2,193,809 | Dirkes et al. | Mar. 19, 1940 |
| 2,755,161 | Rahmel | July 17, 1956 |

FOREIGN PATENTS

| | | |
|---|---|---|
| 781,084 | Great Britain | Aug. 14, 1957 |